(12) United States Patent
Kikuchi et al.

(10) Patent No.: US 7,788,925 B2
(45) Date of Patent: Sep. 7, 2010

(54) VEHICLE POWER SUPPLY SYSTEM

(75) Inventors: Tetsurou Kikuchi, Nishio (JP);
Hiroyuki Usami, Kariya (JP); Akira Kato, Anjo (JP); Hisayoshi Oshima, Oobu (JP)

(73) Assignee: Denso Corporation, Kariya (JP)

( * ) Notice: Subject to any disclaimer, the term of this patent is extended or adjusted under 35 U.S.C. 154(b) by 749 days.

(21) Appl. No.: 11/717,733

(22) Filed: Mar. 14, 2007

(65) Prior Publication Data

US 2007/0220890 A1    Sep. 27, 2007

(30) Foreign Application Priority Data

Mar. 24, 2006    (JP) ............... 2006-082734

(51) Int. Cl.
*F02D 25/00*    (2006.01)
*F02B 43/08*    (2006.01)
*F01P 3/00*    (2006.01)

(52) U.S. Cl. .................. 60/714; 123/3; 123/41.42; 429/13; 429/34

(58) Field of Classification Search ............... None
See application file for complete search history.

(56) References Cited

U.S. PATENT DOCUMENTS

| 4,530,034 | A | * | 7/1985 | Kawarada ............ 362/9 |
| 5,192,445 | A | * | 3/1993 | Bartels ............ 210/640 |
| 5,808,448 | A | * | 9/1998 | Naito ............ 322/13 |
| 6,699,457 | B2 | | 3/2004 | Cortright et al. |
| 6,818,146 | B2 | * | 11/2004 | Eaton et al. ............ 252/73 |
| 6,964,757 | B2 | | 11/2005 | Cortright et al. |
| 6,964,758 | B2 | | 11/2005 | Cortright et al. |
| 7,156,131 | B2 | * | 1/2007 | Adams et al. ............ 141/98 |
| 2003/0168024 | A1 | * | 9/2003 | Qian et al. ............ 123/3 |
| 2004/0076860 | A1 | * | 4/2004 | Aso ............ 429/23 |
| 2005/0112417 | A1 | | 5/2005 | Oshima et al. |
| 2006/0170390 | A1 | | 8/2006 | Kikuchi et al. |
| 2006/0191727 | A1 | | 8/2006 | Usami et al. |

FOREIGN PATENT DOCUMENTS

| JP | A 5-244731 | 9/1993 |
| JP | A 10-70843 | 3/1998 |
| JP | A 2002-209301 | 7/2002 |
| JP | A 2004-168263 | 6/2004 |
| JP | A 2005-158335 | 6/2005 |
| JP | A 2006-210168 | 8/2006 |
| JP | A 2006-221864 | 8/2006 |
| WO | WO 2004/036674 A2 | 4/2004 |

\* cited by examiner

*Primary Examiner*—Melvin C Mayes
*Assistant Examiner*—Colin W Slifka
(74) *Attorney, Agent, or Firm*—Oliff & Berridge, PLC (57) ABSTRACT

The vehicle power generation system, which is mounted on a vehicle having an internal combustion engine as a travel drive power source, and a cooling device for cooling the internal combustion engine by use of coolant containing one of alcohol and ether, includes a fuel cell generating electric energy by electrochemical reaction between one of alcohol and ether as fuel and oxidant in the fuel cell, and a fuel supply device operating to supply one of alcohol and ether contained in the coolant to the fuel cell.

23 Claims, 8 Drawing Sheets

VEHICLE POWER SUPPLY SYSTEM

CROSS-REFERENCE TO RELATED APPLICATION

This application is related to Japanese Patent Application No. 2006-82734 filed on Mar. 24, 2006, the contents of which are hereby incorporated by reference.

BACKGROUND OF THE INVENTION

1. Field of the Invention

The present invention relates to a vehicle power generation system mounted on a vehicle having an internal combustion engine as a travel drive power source, and including a fuel cell which runs on ethylene glycol or the like separated from fuel of the internal combustion engine to generate electric power.

2. Description of Related Art

In recent years, a battery mounted on a vehicle tends to be easily overdischarged when the vehicle is parked, which is due to an increase of the number of vehicle-mounted accessories and their functions. This causes a consumption current (dark current) of the battery when the vehicle is parked to increase. In addition, a remaining capacity of the vehicle battery decreases with time by self-discharge while the vehicle is parked. The decrease of the remaining capacity is promoted even when the vehicle is running, if an electrical load increases to such an extent that a balance between charging and discharging of the vehicle battery is lost.

In a vehicle in which a fuel cell is mounted, the vehicle battery of the vehicle can be charged by use of this fuel cell even when a vehicle engine is stopped. However, in this case, fuel supply to the fuel cell has to be secured. As a solution to this, the applicant of this application has proposed to use methanol contained in window washer fluid as fuel for the fuel cell (refer to Japanese Patent Application Laid-open No. 2005-158335).

However, although methanol is suitable for use as the fuel for a direct-fuel type fuel cell, it possesses toxicity. In addition, since methanol is small in molecular size, and accordingly it easily permeates through an electrolyte membrane included in the fuel cell, which causes lowering of a generation voltage of the fuel cell. It is possible to prevent methanol from permeating through the electrolyte membrane by increasing a thickness of the electrolyte membrane. However, in this case, an internal electrical resistance of the fuel cell increases. Furthermore, if a user of the vehicle puts different fluid from the window washer fluid in a window washer fluid reservoir, it becomes difficult for the fuel cell to generate electric power.

SUMMARY OF THE INVENTION

The present invention provides a vehicle power generation system mounted on a vehicle having an internal combustion engine as a travel drive power source, and a cooling device for cooling the internal combustion engine by use of coolant containing one of alcohol and ether, the vehicle power generation system comprising:

a fuel cell generating electric energy by electrochemical reaction between one of alcohol and ether as fuel and oxidant in the fuel cell; and a fuel supply device operating to supply one of alcohol and ether contained in the coolant to the fuel cell.

The fuel cell may be configured to generate electric energy by electrochemical reaction between one of ethylene glycol, diethylene glycol, and triethylene glycol.

The fuel supply device may include a separating device for separating ethylene glycol from ethylene glycol-containing coolant.

The separating device may include a separation membrane allowing water to pass therethrough, and not allowing ethylene glycol to pass therethrough.

The separating device may include a vibrator section for vibrating the separation membrane.

The separating device may include a vibrator section for vibrating the coolant in the vibrating device.

The fuel cell may be configured to supply the electric energy generated by the electrochemical reaction to at least one of a rechargeable battery mounted on the vehicle to accumulate electric power required to start the internal combustion engine, and an electrical load consuming electric power while the internal combustion engine is stopped.

The vehicle power generation system may further comprise a control unit controlling supply alcohol or ether from the fuel supply device to the fuel cell such that the supply is started when a predetermined condition is satisfied.

The predetermined condition may be the lapse of a predetermined time from when the internal combustion engine stops.

The predetermined condition may be that the internal combustion engine is in a stopped state.

The fuel cell may be constituted by a plurality of fuel-cell cells electrically connected in series.

The vehicle power generation system may further comprise a voltage conversion circuit stepping up a generation voltage of the fuel cell.

The voltage conversion circuit may include a plurality of voltage stepup circuits to step up the generation voltage in multiple stages.

The voltage conversion circuit may be configured to operate on electric power supplied from the rechargeable battery.

The present invention also provides a vehicle power generation system mounted on a vehicle having an internal combustion engine as a travel drive power source, and a cooling device for cooling the internal combustion engine by use of coolant containing one of ethylene glycol, diethylene glycol, and triethylene glycol; the vehicle power generation system comprising:

a fuel cell generating electric energy by electrochemical reaction between hydrogen as fuel and oxidant in the fuel cell; and a fuel supply device reforming the coolant to produce hydrogen, and supplying the produced hydrogen to the fuel cell.

According to the present invention, it is possible to prevent a remaining capacity of a vehicle battery mounted on a vehicle from lowering while an internal combustion engine of the vehicle is stopped, to thereby save electric power needed to start the internal combustion engine.

In addition, since a fuel for the fuel cell can be obtained from the engine coolant, it is not necessary for the user of the vehicle to carry out any special operation or maintenance for the fuel cell, if the user checks the engine coolant in the usual way.

Other advantages and features of the invention will become apparent from the following description including the drawings and claims.

PREFERRED EMBODIMENTS OF THE INVENTION

First Embodiment

Figure 1:
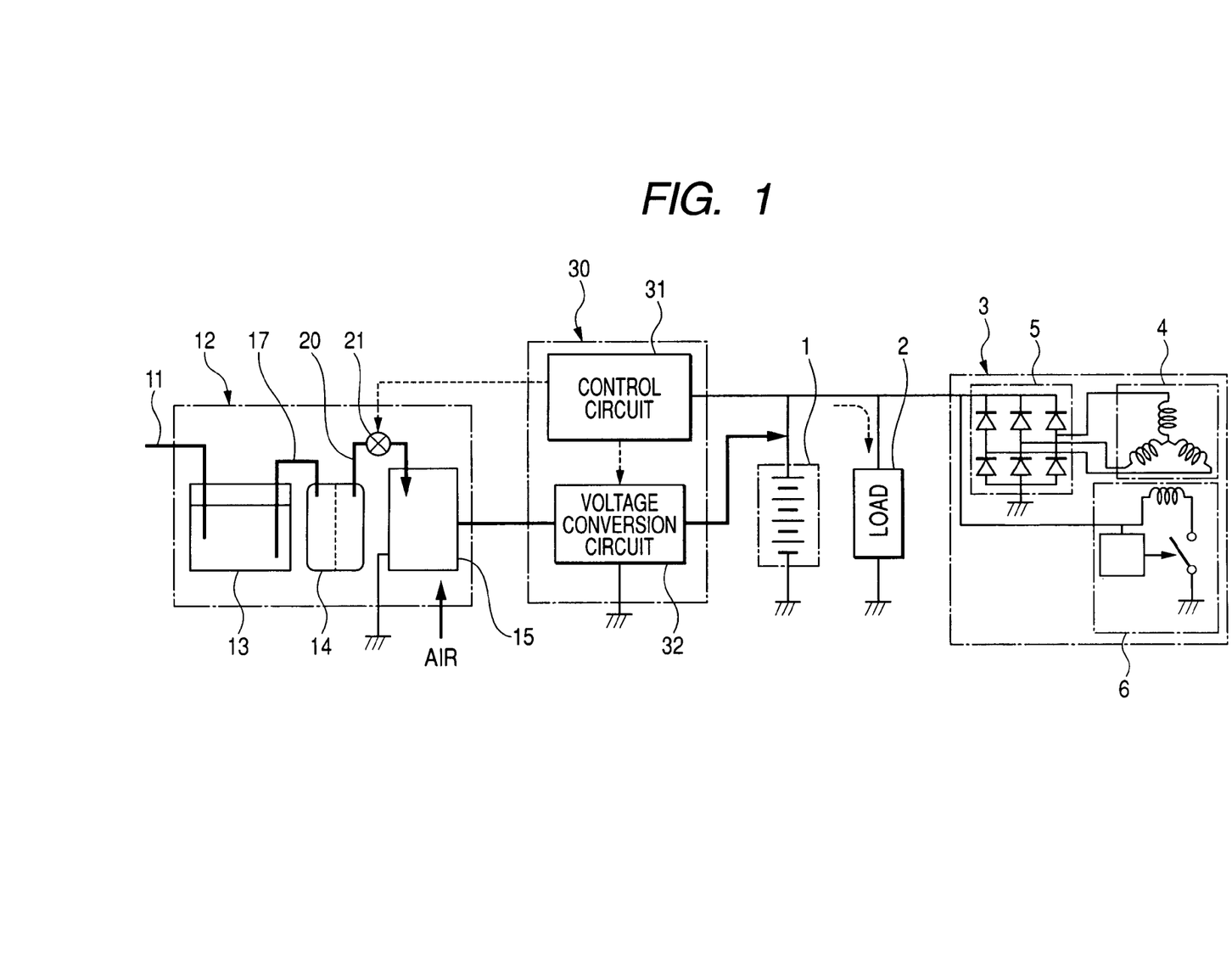
FIG. 1 is a diagram explaining an overall structure of a vehicle power generation system according to a first embodiment of the invention, which is mounted on a vehicle.
Figure 2:
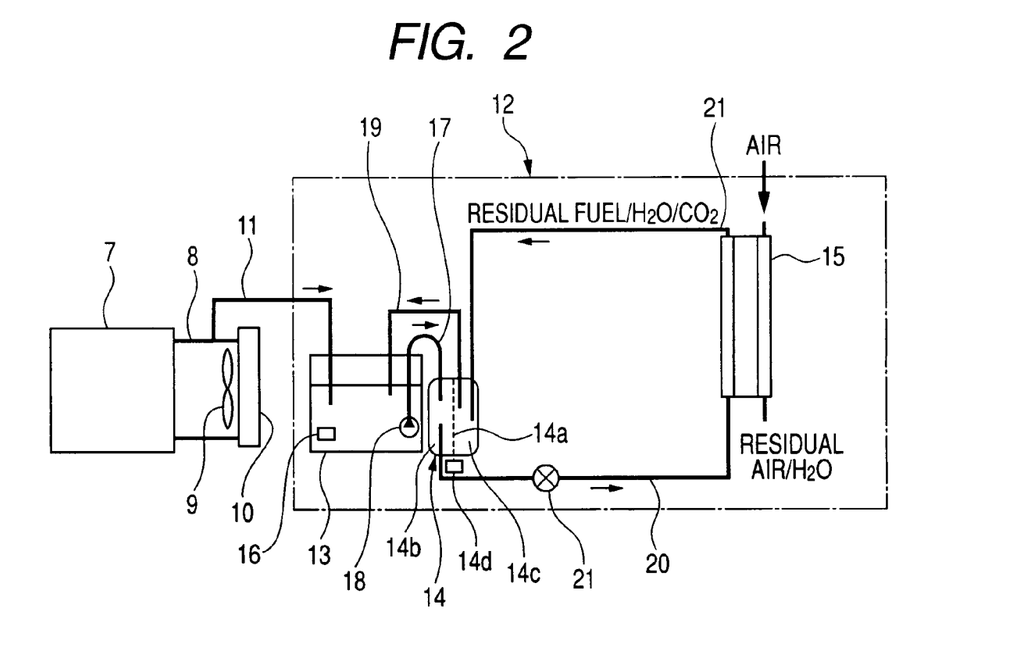
FIG. 2 is a diagram showing a structure of a fuel cell unit included in the vehicle power generation system shown in FIG. 1.

FIG. 1 is a diagram explaining an overall structure of a vehicle power generation system according to a first embodiment of the invention, which is mounted on a vehicle with an internal combustion engine 7 (shown in FIG. 2) as a travel drive power source, an electric generator 3 driven by the internal combustion engine 7, and electrical loads 2 mounted thereon. FIG. 2 is a diagram showing a structure of a fuel cell unit 12 included in the vehicle power generation system shown in FIG. 1. The vehicle power generation system includes the fuel cell unit 12, and a control unit 30.

A rechargeable battery 1 mounted on a vehicle is for accumulating therein electric power generated by the electric generator 3 when the internal combustion engine 7 is running, and supplying electric power to various accessories. The rechargeable battery 1 supplies electric power also to a starter (not shown) at the time of starting the internal combustion engine 7.

The electrical loads 2 includes loads which need to be always supplied with electric power even when the internal combustion engine 7 is stopped, such as a clock and a remote control type door lock switch. The electrical loads 2 are supplied with electric power from the electric generator 3 when the internal combustion engine 7 is running, and from the rechargeable battery 1 while the internal combustion engine 7 is stopped.

The electric generator 3 includes an alternator 4, a rectifier 5, and a regulator 6. The alternator 4 is driven by a torque transmitted from the internal combustion engine 7 to generate an AC voltage. The rectifier 5 rectifies the AC voltage generated by the alternator 4 into a DC voltage, and supplies it to the rechargeable battery 1 and to the regulator 6. The regulator 6 operates to control the output power of the alternator 4 such that the output DC voltage of the alternator 4 does not exceed an upper limit voltage.

The fuel cell unit 12 includes a coolant reservoir 13, a separating device 14, and a fuel cell 15. In this embodiment, the fuel cell 15 is a direct ethylene glycol fuel cell (DEGFC) using ethylene glycol ($HOCH_2CH_2OH$) as fuel. Accordingly, coolant used for cooling the internal combustion engine 7, which contains ethylene glycol, is stored in the coolant reservoir 13 in a liquid state as fuel for the fuel cell 15. It is preferable to use, as the fuel cell 15, a solid polymer electrolyte membrane type fuel cell operable at room temperature, so that the vehicle power generation system can operate while the vehicle is parked.

The fuel cell 15 is for generating electric power to charge the rechargeable battery 1 when the internal combustion engine 7 is stopped. In a case where the electromotive force of the rechargeable battery 1 is 12V, and a sum of consumption currents of the electrical loads 2 is about 50 mA, it is suffice that the fuel cell 15 has a power generation capacity of 50 mA×12V=0.6W However, in this embodiment, the fuel cell 15 has a maximum power generation capacity as high as about 10W, so that the rechargeable battery 1 can be rapidly restored when it has been overcharged.

As shown in FIG. 2, the vehicle is provided with a cooling device for cooling the internal combustion engine 7. This cooling device includes a coolant circulation channel 8 through which coolant flows into and out of the internal combustion engine 7, and a radiator 10 with a fan 9. As the coolant, a mixed liquid of ethylene glycol and water, which is commonly used as long life coolant (LLC), can be used. In this embodiment, the coolant contains 30% to 60% ethylene glycol.

The coolant circulation channel 8 and the coolant reservoir 13 are connected to each other through a coolant bypass channel 11, so that the coolant can be supplied to the coolant reservoir 13 by way of the coolant circulation channel 8 and the coolant bypass channel 11. The coolant reservoir 13 is provided therein a liquid-level sensor 16 for detecting a liquid level of the coolant. The coolant reservoir 13 and the separating device 14 are connected to each other through a coolant supply channel 17, so that the coolant can be supplied to the separating device 14 through the coolant supply channel 17. The coolant reservoir 13 is provided therein also a coolant supply pump 18 for pressure-feeding the coolant into the coolant supply channel 17.

Since lowering of the ethylene glycol concentration causes lowering of the generation voltage of the fuel cell 15, ethylene glycol is separated from water by use of the separating device 14 in order to keep the ethylene glycol concentration within a certain range.

The separating device 14 includes therein a first chamber 14b, and a second chamber 14c partitioned by a separation membrane 14a. The coolant is supplied from the coolant reservoir 13 into the first chamber 14b. The separation membrane 14a has such a characteristic that it allows water to transmit therethrough, and does not allow ethylene glycol to transmit therethrough. Accordingly, water contained in the coolant in the first chamber 14b moves into the second chamber 14c through the separation membrane 14a, as a result of which the ethylene glycol concentration of the coolant in the first chamber 14b increases. The second chamber 14c is connected to the coolant reservoir 13 through a return channel 19, so that the water separated from ethylene glycol by the separating device 14 returns to the coolant reservoir 13.

The separating device 14 includes a vibrator section 14d for vibrating the separation membrane 14a to improve efficiency of separation between ethylene glycol and water. As the vibrator section 14d, a vibrator motor can be used.

The first chamber 14b of the separating device 14 and the fuel cell 15 are connected to each other through a fuel supply channel 20. The fuel supply channel 20 is provided with an open/close valve 21.

Normally, the fuel supply channel 20 is shut off by the open/close valve 21. The open/close valve 21 opens when the fuel cell 15 is started. The opening of the open/close valve 21 causes supply of ethylene glycol in the first chamber 14*b* of the separating device 14 into the fuel cell 15 through the fuel supply channel 20. As a consequence, in the fuel cell 15, an electrochemical reaction occurs between hydrogen produced from the ethylene glycol as a fuel, and oxygen contained in the air as an oxidant to start power generation.

Figure 3:
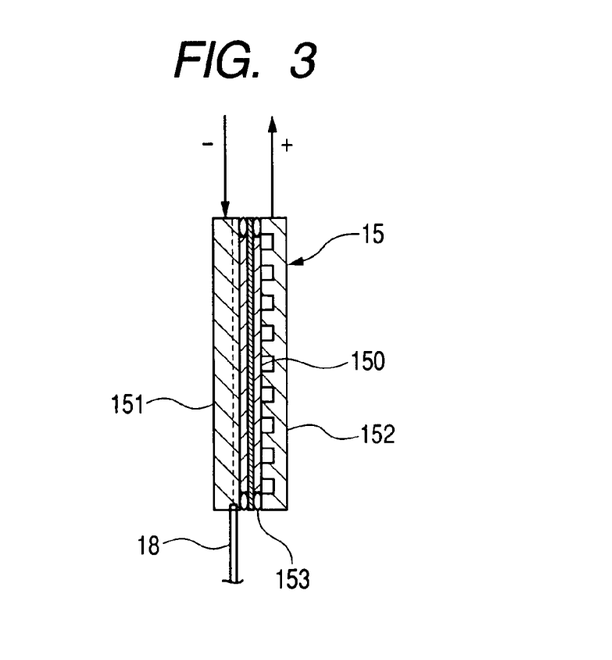
FIG. 3 is a diagram schematically showing a main part of a fuel cell included in the fuel cell unit shown in FIG. 2.

FIG. 3 is a diagram schematically showing a main part of the fuel cell 15. As shown in this figure, the fuel cell 15 is constituted mainly by a membrane electrode assembly (MEA) 150 including an electrolyte membrane and two electrodes disposed at the both sides of the electrolyte membrane, and a fuel-cell cell constituted by a pair of separators 151, 152 holding therebetween the MEA 150. In this embodiment, the fuel cell 15 is of the type having a single-layered fuel-cell cell. The electrolyte membrane of the MEA 150 is sealed by a sealant filled therearound. As the electrolyte membrane of the MEA 150, an OH$^-$ ion (anion) conduction type membrane (for example, the BA series manufactured by TOKUYAMA Inc.) can be used. As a catalyst of the MEA 150, the oxidation catalyst for ethylene glycol disclosed in EP Patent Application Publication No. 1556916 can be used.

The separators 151, 152 are formed as a plate-like member made of carbon or conductive metal. The separator 151, which is located on the anode side, is formed with a groove indicated by a broken line shown in FIG. 3, through which ethylene glycol is supplied from the separating device 14. The separator 152, which is located on the cathode side, is formed with grooves through which the air is supplied. Since the generation capacity of the fuel cell 15 is not so large (about 10W), it is not necessary to forcibly supply the air. Accordingly, in this embodiment, the air is supplied to the separator 152 on the cathode side by natural convection.

In the fuel cell 15, the following reactions occur to generate electric energy.

On the anode side: $HOCH_2CH_2OH + 10OH^- \rightarrow 2CO_2 + 8H_2O + 10e^-$

On the cathode side: $5/2O_2 + 5H_2O + 10e^- \rightarrow 10OH$

Water produced at the anode side diffuses into the electrolyte membrane, and reaches the cathode side to be used there.

Returning back to FIG. 2, the fuel cell 15 is provided with a residual fuel discharge channel 21 at the anode side, through which a residual fuel (ethylene glycol that has not been used in the electrochemical reaction), water, and carbon dioxide are discharged. This residual fuel discharge channel 21 is connected to the second chamber 14*c* of the separating device 14, so that the residual fuel is supplied to the second chamber 14*c* of the separating device 14. The residual fuel discharge channel 21 may be connected the coolant reservoir 13.

Returning back to FIG. 1, the control unit 30 of the vehicle power generation system of this embodiment includes a control circuit 31, and a voltage conversion circuit 32 which operate on the power supplied from the rechargeable battery 1. The control circuit 31 is constituted by a microcomputer including a CPU, a ROM, a RAM, and an I/O, and is capable of performing various computations in accordance with programs stored in the ROM. In this embodiment, the control circuit 31 is configured to detect a running state of the internal combustion engine 7 to perform open/close control of the open/close valve 21, and actuation control of the coolant supply pump 18.

The voltage conversion circuit 32 operates to step up a voltage generated by the fuel cell 15 to a voltage high enough to charge the rechargeable battery 1. More specifically, a generation voltage of 0.5 to 0.8V outputted from the single-cell-type fuel cell 15 is stepped up by the voltage conversion circuit 32 to a level of an electromotive force (12V, for example) of the rechargeable battery 1.

Figure 4:
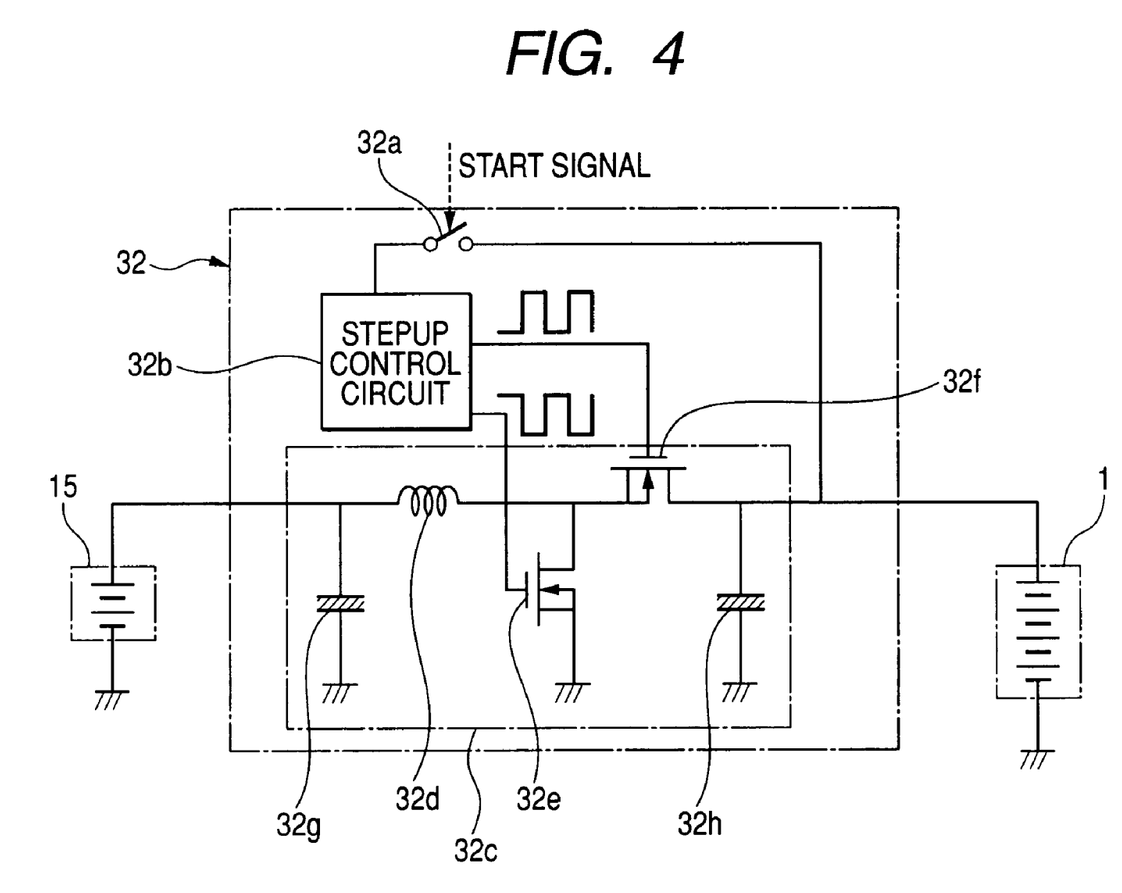
FIG. 4 is a diagram showing a structure of a voltage conversion circuit of a control unit included in the vehicle power generation system shown in FIG. 1.

FIG. 4 is a diagram showing a structure of the voltage conversion circuit 32. As shown in this figure, the voltage conversion circuit 32 includes a switch 32*a* whose closure is controlled by an activation signal sent from the control circuit 31, a stepup control circuit 32*b*, and a DC/DC converter 32*c*. The DC/DC converter 32*c*, which includes a coil 32*d*, switching elements 32*e*, 32*f*, and capacitors 32*g*, 32*h*, is configured to perform a voltage stepup operation where the energy accumulated in the coil 32*d* is switched by the switching elements 32*e*, 32*f*, and smoothed by the capacitors 32*g*, 32*h*.

Next, the operation of the vehicle power generation system of this embodiment is explained.

When the internal combustion engine 7 is running, the ethylene glycol-containing coolant is sent to the coolant reservoir 13 from the coolant circulation channel 8, and stored there.

The control circuit 31 outputs a fuel cell start signal to the coolant supply pump 18, and the open/close valve 21 when a predetermined time has elapsed since the internal combustion engine 7 was stopped. As a consequence, the open/close valve 21 opens, and the coolant supply pump 18 starts to operate. Here, "predetermined time" is set at such a time period that the remaining capacity of the rechargeable battery 1 is estimated to fall below a minimum value required to start the internal combustion engine 7 if this time period has elapsed. This minimum value may be 40% of fully charged capacity of the rechargeable battery 1. In this embodiment, the control circuit 31 is configured to output the fuel cell start signal after an elapse of 40 days from the time when the internal combustion engine 7 was stopped. The internal combustion engine 7 can be detected to be stopped by monitoring the operating state of the alternator 4.

While the internal combustion engine 7 is stopped, the ethylene glycol-containing coolant remains in the coolant reservoir 13. Accordingly, when the coolant supply pump 18 starts to operate to supply the ethylene glycol-containing coolant from the coolant reservoir 13 to the first chamber 14*b* of the separating device 14, ethylene glycol is condensed in the first chamber 14*b*. And when the open/close valve 21 opens, ethylene glycol in the first chamber 14*b* starts to be supplied to the fuel cell 15, as a consequence of which the fuel cell 15 starts to generate power. By stopping the coolant supply pump 18, and closing the open/close valve 21, the fuel cell 15 stops consuming ethylene glycol, and generating electric power.

The voltage outputted from the fuel cell 15 is stepped up by the voltage conversion circuit 32 to such a voltage that the rechargeable battery 1 can be charged. This makes it possible to prevent the remaining capacity of the rechargeable battery 1 from lowering while the internal combustion engine 7 is stopped, to thereby save electric power needed to start the internal combustion engine 7.

When the liquid-level sensor 16 outputs a signal indicative of low liquid level of the coolant, a user of the vehicle can refill the ethylene glycol-containing coolant at a gas station, for example. In accordance with this embodiment, since ethylene glycol can be separated from the coolant as fuel for the fuel cell 15, it is not necessary for the user to carry out any special operation or maintenance for the fuel cell 15, if the user checks the engine coolant in the usual way.

Second Embodiment

Next, a second embodiment of the invention is described. The following description focuses on differences between the first embodiment and the second embodiment.

In the second embodiment, the control circuit 31 is configured to detect an open-circuit voltage of the rechargeable battery 1 to estimate an SOC (state of charge) of the rechargeable battery 1. The control circuit 31 outputs the fuel cell start signal to the open/close valve 21, and the coolant supply pump 18, if the estimated SOC of the rechargeable battery 1 is lower than a predetermined value. This predetermined value is set at a minimum value required to start the internal combustion engine 7. For example, it is set at about 40% of the fully charged capacity of the rechargeable battery 1.

The second embodiment offers substantially the same advantages offered by the first embodiment.

Third Embodiment

Next, a third embodiment of the invention is described. The following description focuses on differences between the first embodiment and the third embodiment.

Figure 5:
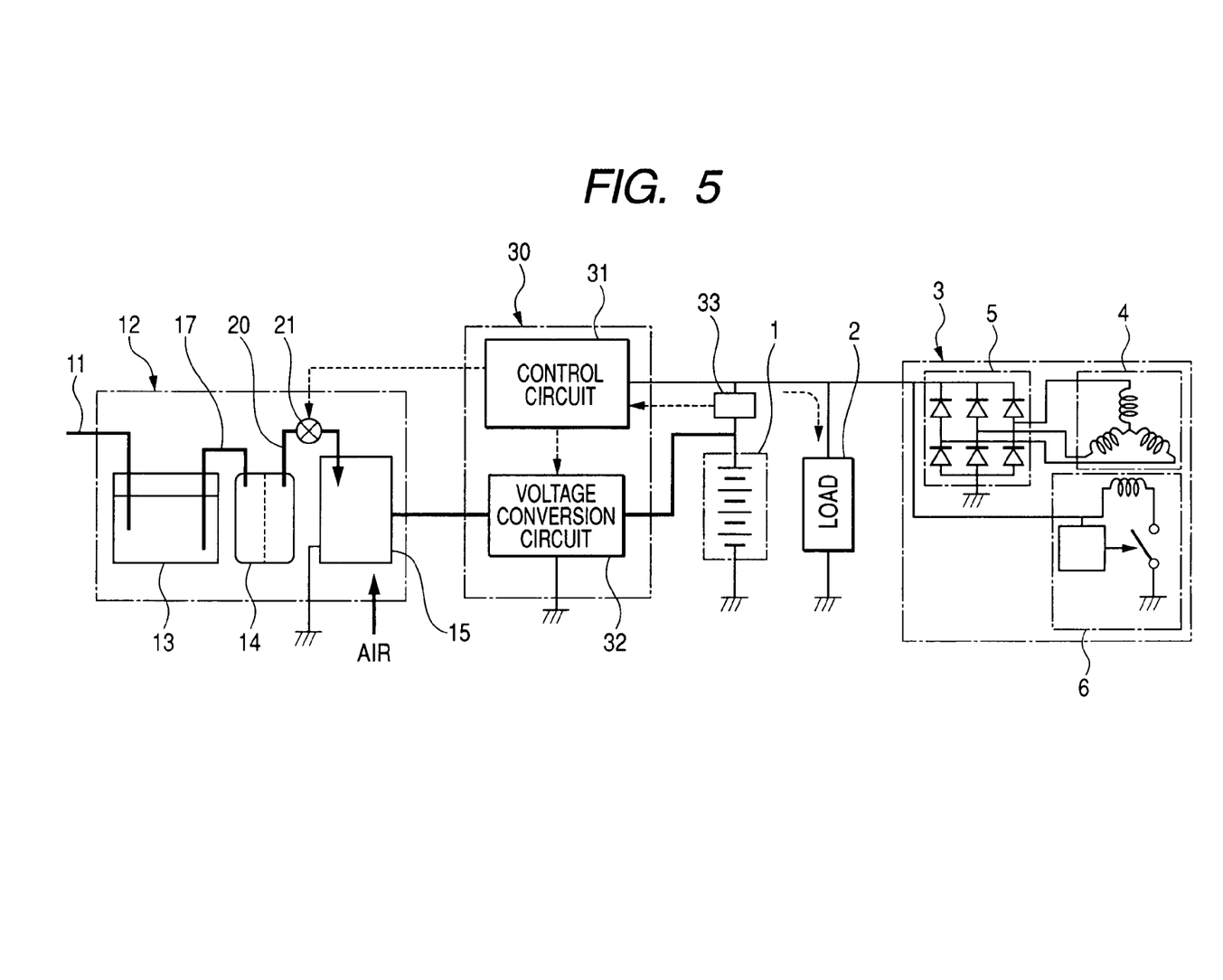
FIG. 5 is a diagram explaining an overall structure of a vehicle power generation system according to a third embodiment of the invention.

FIG. 5 is a diagram explaining an overall structure of a vehicle power generation system according to the third embodiment of the invention. As shown in this figure, the third embodiment is additionally provided with a current sensor 33 for monitoring current transmission and reception of the rechargeable battery 1. The current sensor 33 has a capability of detecting direction and intensity of a current flowing therethrough.

In this embodiment, the control circuit 31 outputs the fuel cell start signal to the coolant supply pump 18 and the open/close valve 21 immediately after it detects that the internal combustion engine 7 is brought to the stopped state. As consequence, the fuel cell 15 starts generating power to charge the rechargeable batter 1. At this time, by charging the rechargeable batter 1 such that no current flows or a very slight current flows in the direction toward the fuel cell 15, while monitoring the current transmission and reception of the rechargeable battery 1 in accordance with a sensor signal outputted from the current sensor 33, it is possible to prevent the rechargeable battery 1 from being overcharged.

According to the third embodiment in which the rechargeable batter 1 starts to be charged immediately after the internal combustion engine 7 is stopped, the power generation capacity of the fuel cell 15 can be small, because the fuel cell 15 is required only to replenish a small current flowing from the rechargeable battery 1.

Fourth Embodiment

Next, a fourth embodiment of the invention is described. The following description focuses on differences between the first embodiment and the fourth embodiment.

Figure 6:
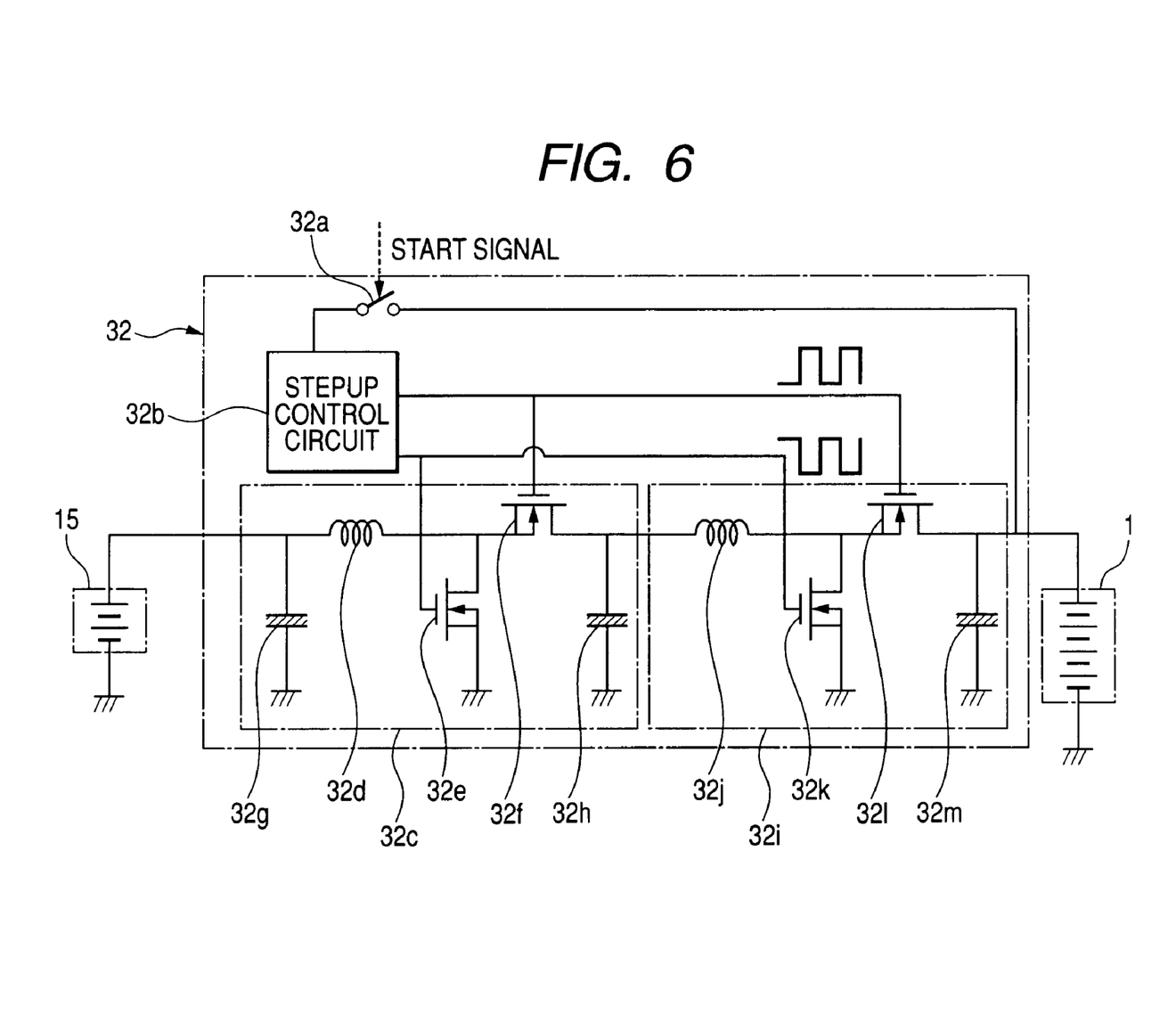
FIG. 6 is a diagram showing a structure of a voltage conversion circuit of a control unit included in the vehicle power generation system according to a fourth embodiment of the invention.

FIG. 6 is a diagram of the voltage conversion circuit 32 used in the fourth embodiment. As seen from this figure, in this embodiment, the conversion circuit 32 includes first and second DC/DC converters 32c, 32i having a similar structure.

The output voltage of 0.6V of the fuel cell 15 is stepped up to about 3V by the first DC/DC converter 32c, and then further stepped up to about 12V by the second DC/DC converter 32i. By stepping up the output voltage of the fuel cell 15 in multiple stages, the energy conversion efficiency can be improved.

Fifth Embodiment

Next, a fifth embodiment of the invention is described with reference to FIG. 7. The following description focuses on differences between the first embodiment and the fifth embodiment.

Figure 7:
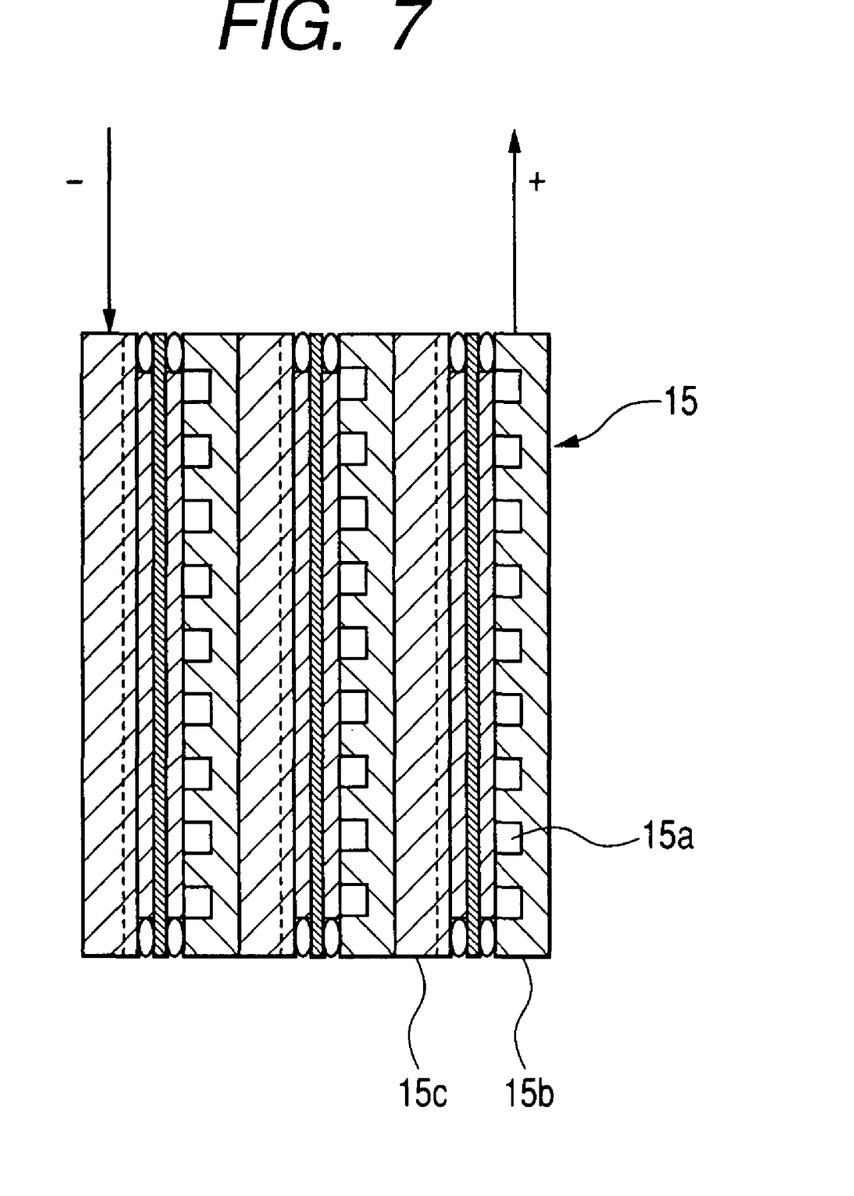
FIG. 7 is a diagram explaining an overall structure of a vehicle power generation system according to a fifth embodiment of the invention.

FIG. 7 is a diagram schematically showing a structure of the fuel cell 15 used in the fifth embodiment. As shown in this figure, the fuel cell 15 used in the fifth embodiment includes a plurality of fuel-cell cells 150, 151, 152 each of which is constituted by the MEA 150 and a pair of the separators 151, 152. These fuel-cell cells 150, 151, 152 are electrically connected in series. By stacking a plurality of the fuel-cell cells 150, 151, 152, it becomes possible to increase the output voltage of the fuel cell 15.

Sixth Embodiment

Next, a sixth embodiment of the invention is described with reference to FIG. 8. The following description focuses on differences between the first embodiment and the sixth embodiment.

Figure 8:
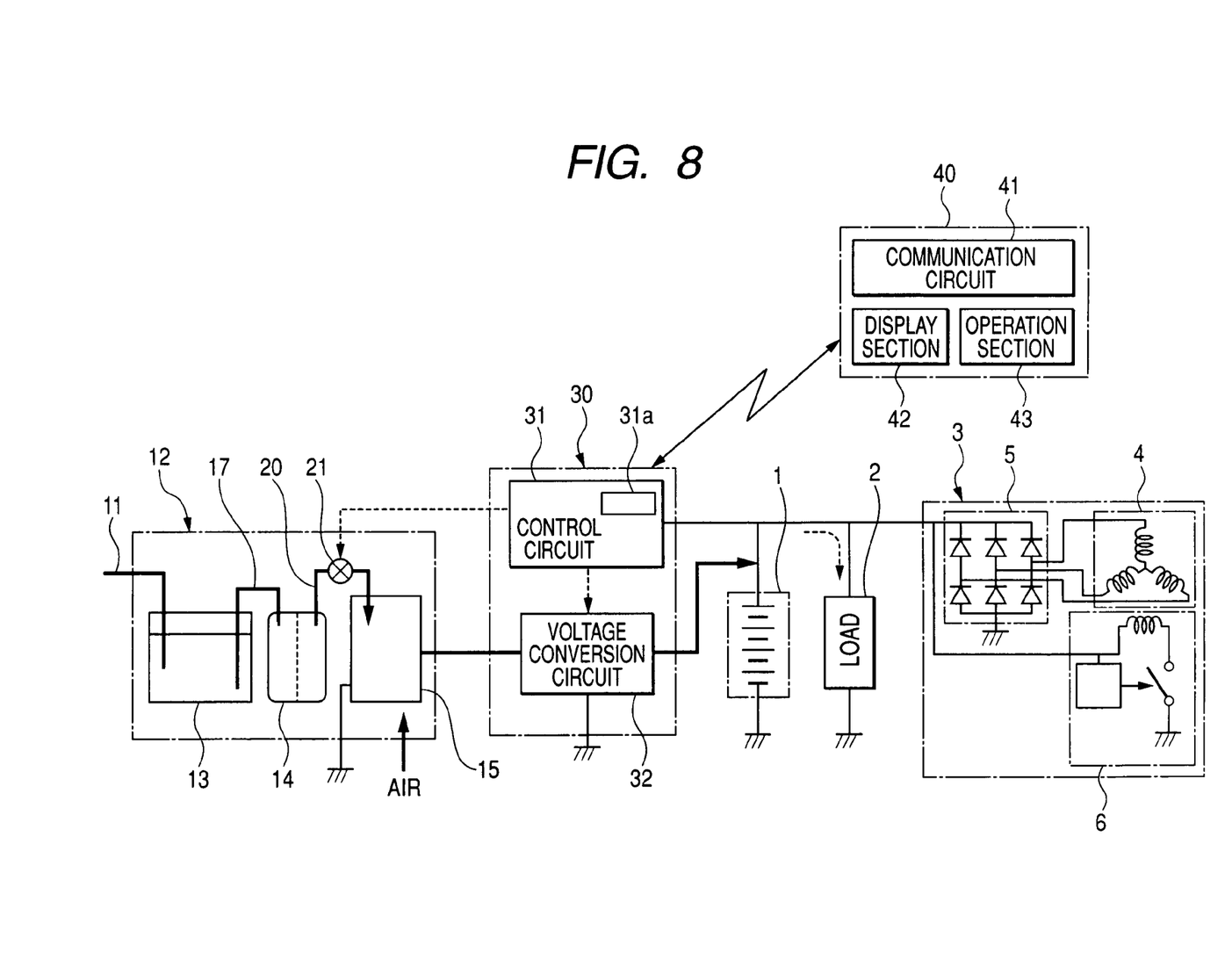
FIG. 8 is a diagram explaining an overall structure of a vehicle power generation system according to a sixth embodiment of the invention.

FIG. 8 is a diagram explaining an overall structure of a vehicle power generation system according to the sixth embodiment. As shown in this figure, the sixth embodiment is provided with a remote device 40 located outside the vehicle. In this embodiment, the control circuit 31 is provided with a communication circuit 31a, so that the control circuit 31 can communicate with the remote device 40 by radio.

The control circuit 31 is configured to transmit, to the remote device 40, a remaining capacity signal when a predetermined time has elapsed since the stop of the internal combustion engine 7, or when the remaining capacity of the rechargeable battery 1 falls below the minimum value required to start the internal combustion engine 7. The control circuit 31 is also configured to receive a fuel cell start command signal transmitted from the remote device 40.

The remote device 40 includes a communication circuit 41 capable of communicating with the control circuit 31, a display section 42, and an operation section 43.

The remote device 40 is for notifying, upon receiving the remaining capacity signal transmitted from the control circuit 31, the user by its display section 42 that the remaining capacity of the rechargeable battery 1 is low, and the rechargeable battery 1 needs to be charged. The operation section 43, which may be a push button, enables the user to transmit a fuel cell start command signal (or rechargeable battery charge command signal) to the control circuit 31.

The control circuit 31 outputs, upon receiving the fuel cell start command signal from the remote device 40, the fuel cell start signal to the coolant supply pump 18 and the open/close valve 21. As a consequence, the fuel cell 15 starts generating power, and the rechargeable battery 1 starts to be charged.

The remote device 40 is located outside the vehicle in this embodiment, however, it may be located inside the vehicle. In this case, the control circuit 31 and the remote device 40 may be configured to communicate with each other by wire.

Seventh Embodiment

Next, a seventh embodiment of the invention is described. The following description focuses on differences between the first embodiment and the seventh embodiment.

Figure 9:
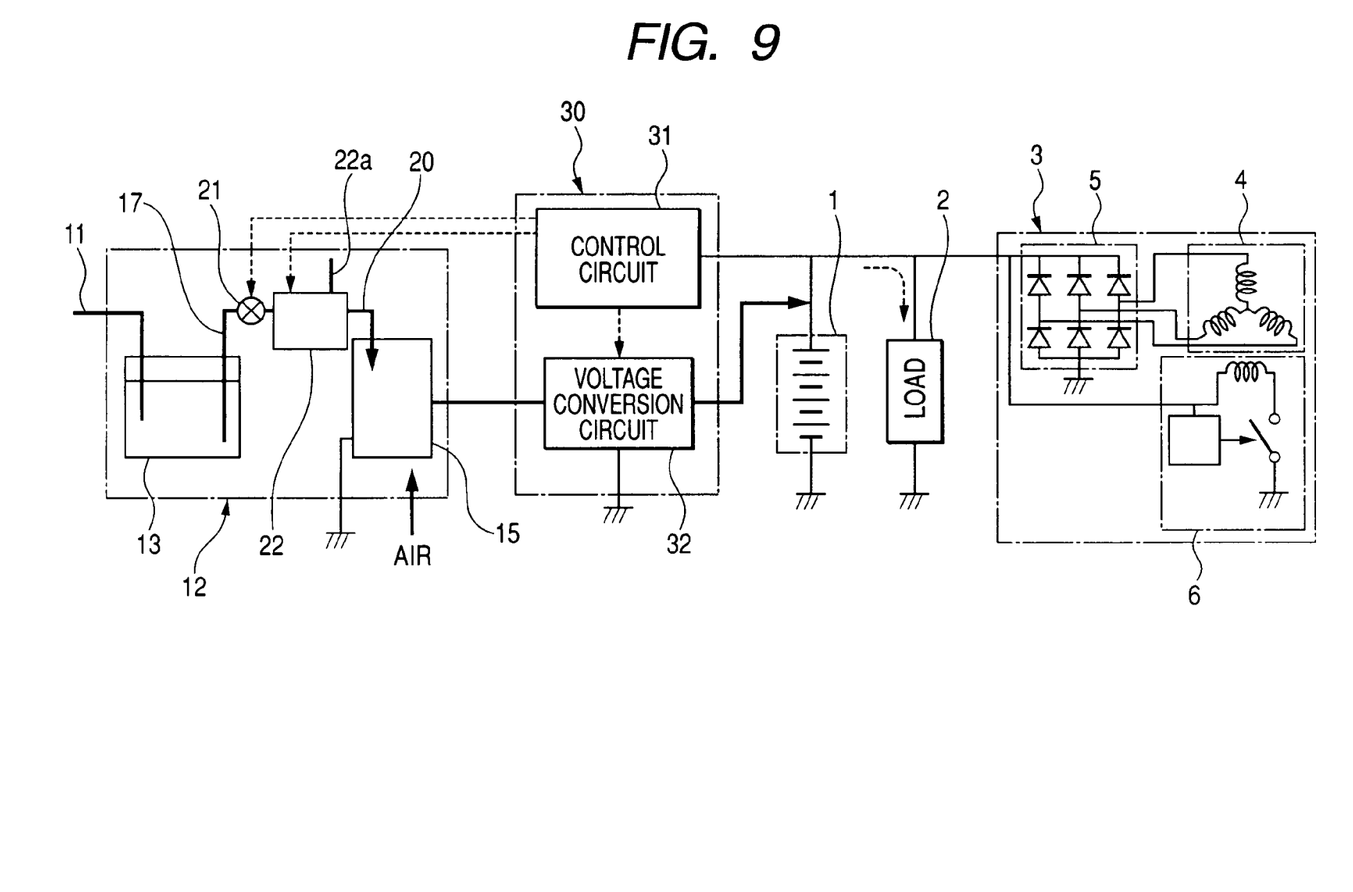
FIG. 9 is a diagram explaining an overall structure of a vehicle power generation system according to a seventh embodiment of the invention.

FIG. 9 is a diagram explaining an overall structure of a vehicle power generation system according to the seventh embodiment. As shown in this figure, the fuel cell unit 12 of this embodiment is provided with a reformer 22. As the reformer 22, the reformers disclosed in U.S. Pat. Nos. 6,699,457, 6,964,757, and 6964758 can be used. The reformer 22 produces hydrogen from ethylene glycol by the following reforming reaction.

The reformer 22 includes an electric heater (not shown) supplied with electric power from the rechargeable battery 1 to heat ethylene glycol above a reform enabling temperature (250 degrees C., for example). However, it becomes unnecessary to heat ethylene glycol by the electric heater after the reforming reaction takes place, because ethylene glycol is heated by heat generated during the reforming reaction.

The reformer 22 is supplied with the ethylene glycol-containing coolant from the coolant reservoir 13 through the coolant supply channel 17 to produce hydrogen. The hydrogen produced in the reformer 22 is supplied to the fuel cell 15 through the fuel supply channel 20. The supply of the ethylene glycol-containing coolant to the reformer 22 from the coolant reservoir 13 is started by opening the open/close valve 21 provided in the coolant supply channel 17, and stopped by closing the open/close valve 21.

In this embodiment, as the electrolyte membrane of the MEA 150, a proton-conduction type polymer electrolyte membrane, such as Nufion produced by DuPont can be used. In the fuel cell 15, the electrochemical reaction between hydrogen as fuel supplied from the reformer 22 and oxygen as oxidant contained in the air takes place to generate electric power.

In this embodiment where the fuel cell 15 uses hydrogen as a fuel, which the reformer 22 produces from ethylene glycol, the fuel cell 15 can generate electric power at high current density, and accordingly at high efficiency. This makes it possible to make the fuel cell 15 compact in size. The reformer 22 is capable of producing hydrogen also by reforming sugared water (glucose solution), or glycerol other than ethylene glycol. Accordingly, if the ethylene glycol-containing coolant runs out, the user can supply sugared water (glucose solution) or glycerol to the reformer 22 to produce hydrogen.

Other Embodiments

Although the electric energy generated by the fuel cell 15 is used to charge the rechargeable battery 1 in the above described embodiments, it may be directly supplied to the electrical loads 2. In this case, the voltage conversion circuit 32 for stepping up the generation voltage of the fuel cell 15 is disposed between the fuel cell 15 and the electrical loads 2.

It should be noted that although the fuel cell 15 has been described to use ethylene glycol having the structural formula of $HOCH_2CH_2OH$ as fuel, the fuel cell 15 can use other alcohols such as diethylene glycol, and triethylene glycol as well.

The fuel cell 15 may be configured to be able to use fuel other than ethylene glycol, for example, ethanol, methanol, and ether such as dimethyl ether, so that the fuel cell 15 can generate electric power when ethylene glycol is not available.

The fuel cell 15 is not limited to the type having an anion-conduction type electrolyte membrane. It may be of the type having a cation-conduction type electrolyte membrane. Also in this case, the fuel cell 15 can generate electric power by use of fuel other than ethylene glycol (for example, ethanol, or methanol, or dimethyl ether).

Although the separating device 14 has been described as having the vibrator section 14d for vibrating the separation membrane 14a, the separating device 14 may have a vibrating means for vibrating the coolant instead of the vibrator section 14d for vibrating the separation membrane 14a.

The vibrator section 14d can be eliminated from the separating device 14.

The vehicle power generating system does not necessarily need the separating device 14, because the fuel cell 15 can generate electric power if the coolant with a normal ethylene glycol concentration is supplied thereto. Accordingly, the separating device 14 can be eliminated.

Although the fuel cell 15 is located away from the coolant reservoir 13 in the above described embodiments, the fuel cell 15 can be located inside or adjacent to the coolant reservoir 13 when the separating device 14 is eliminated. This makes it possible to make the vehicle power supply system compact in size, to thereby improve mountability to the vehicle.

The above explained preferred embodiments are exemplary of the invention of the present application which is described solely by the claims appended below. It should be understood that modifications of the preferred embodiments may be made as would occur to one of skill in the art.

What is claimed is:

1. A vehicle power generation system mounted on a vehicle having an internal combustion engine as a travel drive power source, and a cooling device including a coolant passage through which coolant containing one of alcohol and ether flows for cooling said internal combustion engine, said vehicle power generation system comprising:
   a coolant reservoir connected to said coolant passage for storing said coolant therein;
   a fuel cell generating electric energy by electrochemical reaction between one of alcohol and ether as fuel and oxidant in said fuel cell; and
   a fuel supply device including a passage through which one of alcohol and ether contained in said coolant is supplied from said reservoir to said fuel cell.

2. The vehicle power generation system according to claim 1, wherein said fuel cell is configured to generate electric energy by electrochemical reaction between one of ethylene glycol, diethylene glycol, and triethylene glycol.

3. The vehicle power generation system according to claim 1, wherein said fuel supply device includes a separating device for separating ethylene glycol from ethylene glycol-containing coolant.

4. The vehicle power generation system according to claim 3, wherein said separating device includes a separation membrane allowing water to pass therethrough, and not allowing ethylene glycol to pass therethrough.

5. The vehicle power generation system according to claim 4, wherein said separating device includes a vibrator section for vibrating said separation membrane.

6. The vehicle power generation system according to claim 4, wherein said separating device includes a vibrator section for vibrating said coolant in said vibrating device.

7. The vehicle power generation system according to claim 1, wherein said fuel cell is configured to supply said electric energy generated by said electrochemical reaction to at least one of a rechargeable battery mounted on said vehicle to accumulate electric power required to start said internal combustion engine, and an electrical load consuming electric power while said internal combustion engine is stopped.

8. The vehicle power generation system according to claim 7 further comprising a control unit controlling supply one of alcohol and ether from said fuel supply device to said fuel cell such that said supply is started when a predetermined condition is satisfied.

9. The vehicle power generation system according to claim 8, wherein said predetermined condition is a lapse of a predetermined time from when said internal combustion engine stops.

10. The vehicle power generation system according to claim 8, wherein said predetermined condition is that said internal combustion engine is in a stopped state.

11. The vehicle power generation system according to claim 7, wherein said fuel cell is constituted by a plurality of fuel-cell cells electrically connected in series.

12. The vehicle power generation system according to claim 7, further comprising a voltage conversion circuit stepping up a generation voltage of said fuel cell.

13. The vehicle power generation system according to claim 12, wherein said voltage conversion circuit includes a plurality of voltage stepup circuits to step up said generation voltage in multiple stages.

14. The vehicle power generation system according to claim 12, wherein said voltage conversion circuit is configured to operate on electric power supplied from said rechargeable battery.

15. A vehicle power generation system mounted on a vehicle having an internal combustion engine as a travel drive power source, and a cooling device including a coolant passage through which coolant containing one of ethylene glycol, diethylene glycol, and triethylene glycol flows for cooling said internal combustion engine; said vehicle power generation system comprising:
- a coolant reservoir connected to said coolant passage for storing said coolant therein;
- a fuel cell generating electric energy by electrochemical reaction between hydrogen as fuel and oxidant in said fuel cell; and
- a fuel supply device including a reformer disposed in a passage connecting said reservoir to said fuel cell to reform said coolant to produce hydrogen to be supplied to said fuel cell through said passage.

16. The vehicle power generation system according to claim 15, wherein said fuel cell is configured to supply said electric energy generated by said electrochemical reaction to at least one of a rechargeable battery mounted on said vehicle to accumulate electric power required to start said internal combustion engine, and an electrical load consuming electric power while said internal combustion engine is stopped.

17. The vehicle power generation system according to claim 15 further comprising a control unit controlling supply of hydrogen from said fuel supply device to said fuel such that supply of said supply is started when a predetermined condition is satisfied.

18. The vehicle power generation system according to claim 17, wherein said predetermined condition is a lapse of a predetermined time from stop said internal combustion engine.

19. The vehicle power generation system according to claim 17, wherein said predetermined condition is that said internal combustion engine is in a stopped state.

20. The vehicle power generation system according to claim 15, wherein said fuel cell is constituted by a plurality of fuel-cell cells electrically connected in series.

21. The vehicle power generation system according to claim 15, further comprising a voltage conversion circuit stepping up a generation voltage of said fuel cell.

22. The vehicle power generation system according to claim 21, wherein said voltage conversion circuit includes a plurality of voltage stepup circuits to step up said generation voltage in multiple stages.

23. The vehicle power generation system according to claim 21, wherein said voltage conversion circuit is configured to operate on electric power supplied from said rechargeable battery.

* * * * *